(12) United States Patent
Thurmeier et al.

(10) Patent No.: US 11,223,086 B2
(45) Date of Patent: Jan. 11, 2022

(54) ACCUMULATOR ARRANGEMENT

(71) Applicant: AUDI AG, Ingolstadt (DE)

(72) Inventors: Markus Thurmeier, Adlkofen (DE); Martin Schuessler, Koesching (DE); Markus Bahr, Ingolstadt (DE); Stephan Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 348 days.

(21) Appl. No.: 16/465,721

(22) PCT Filed: Nov. 16, 2017

(86) PCT No.: PCT/EP2017/079472
§ 371 (c)(1),
(2) Date: May 31, 2019

(87) PCT Pub. No.: WO2018/104023
PCT Pub. Date: Jun. 14, 2018

(65) Prior Publication Data
US 2021/0305650 A1   Sep. 30, 2021

(30) Foreign Application Priority Data
Dec. 7, 2016   (DE) ...................... 10 2016 224 318.7

(51) Int. Cl.
*H01M 50/209* (2021.01)
*B60L 50/60* (2019.01)
*H01M 50/517* (2021.01)
*H01M 10/625* (2014.01)

(52) U.S. Cl.
CPC ........... *H01M 50/209* (2021.01); *B60L 50/66* (2019.02); *H01M 50/517* (2021.01); *H01M 10/625* (2015.04); *H01M 2220/20* (2013.01)

(58) Field of Classification Search
CPC ............. H01M 50/209; H01M 50/517; H01M 10/625; H01M 2220/20; H01M 50/202; H01M 50/204
See application file for complete search history.

(56) References Cited

U.S. PATENT DOCUMENTS

| | | | | |
|---|---|---|---|---|
| 3,338,452 A | * | 8/1967 | Oakley | H01M 50/258 220/23.4 |
| 8,062,698 B2 | * | 11/2011 | Chopra | H05K 1/097 427/123 |
| 2005/0269995 A1 | | 12/2005 | Donnelly et al. | |

(Continued)

FOREIGN PATENT DOCUMENTS

| | | |
|---|---|---|
| CN | 101180749 A | 5/2008 |
| CN | 101548411 A | 9/2009 |

(Continued)

OTHER PUBLICATIONS

WO 2012/105643 machine English translation (Year: 2012).*

(Continued)

*Primary Examiner* — Michael L Dignan
(74) *Attorney, Agent, or Firm* — Maier & Maier, PLLC

(57) ABSTRACT

An accumulator arrangement including several separate storage facilities for the storage of electrical energy, wherein every storage facility is incorporated in a bar-shaped hollow profile forming an equipment case, wherein the hollow profiles are connected to one another to form a tight composite.

12 Claims, 4 Drawing Sheets

(56) References Cited

U.S. PATENT DOCUMENTS

| | | | |
|---|---|---|---|
| 2009/0111015 A1* | 4/2009 | Wood | H01M 50/20 429/164 |
| 2010/0028764 A1* | 2/2010 | Maier | H01M 10/625 429/120 |
| 2012/0270087 A1 | 10/2012 | Schaefer et al. | |
| 2015/0221912 A1 | 8/2015 | Kuhn et al. | |
| 2015/0280190 A1* | 10/2015 | Ohshiba | H01M 50/209 429/53 |
| 2016/0226042 A1* | 8/2016 | Hartmann | H01M 10/659 |
| 2019/0131602 A1* | 5/2019 | Hilfrich | H01M 50/20 |

FOREIGN PATENT DOCUMENTS

| | | | |
|---|---|---|---|
| CN | 105981197 A | 9/2016 | |
| DE | 39 42 224 A1 | 6/1991 | |
| DE | 10 2012 22 3518 A1 | 6/2014 | |
| DE | 10 2014 206 646 A1 | 10/2015 | |
| EP | 2 022 110 B1 | 10/2011 | |
| EP | 2 587 565 B1 | 11/2016 | |
| JP | H11-67178 A | 3/1999 | |
| JP | 2007/048637 * | 2/2007 | H01M 2/10 |
| JP | 2007-48637 A | 2/2007 | |
| KR | 2015-0091995 A | 8/2015 | |
| WO | 2012105643 A1 | 8/2012 | |
| WO | WO 2012/105643 * | 8/2012 | H05K 7/18 |

OTHER PUBLICATIONS

Examination Report dated Jul. 31, 2017 of corresponding German application No. 10 2016 224 318.7; 15 pages.
International Search Report and Written Opinion of the International Searching Authority dated Jan. 11, 2018 in corresponding International application No. PCT/EP2017/079472; 34 pages.
International Preliminary Report on Patentability dated Dec. 10, 2018 in corresponding International application No. PCT/EP2017/079472; 27 pages.
Chinese Office Action dated Jun. 2, 2021, in connection with corresponding CN Application No. 201780075331.3 (13 pp., including machine-generated English translation).
English translation of the International Preliminary Report on Patentability (Chapter II) dated Jun. 13, 2019, in corresponding International application No. PCT/EP2017/079472; 6 pages.
Office Action dated Jun. 5, 2020, in corresponding Korean Application No. 10-2019-7017830, 10 pages.

* cited by examiner

ACCUMULATOR ARRANGEMENT

FIELD

The disclosure relates to an accumulator arrangement comprising several separate storage facilities for the storage of electrical energy.

BACKGROUND

Storage facilities for electrical energy represent an essential component of electrically driven motor vehicles that both affect the usefulness of electric vehicles and make up a significant fraction of manufacturing costs. For example, the range of the motor vehicle is determined by, among other things, the capacity of the storage facility and the weight of the motor vehicle. In today's motor vehicles, the individual storage facilities of an accumulator arrangement are mostly accommodated in a large housing. In the process, this housing takes over the role of protecting the storage facilities from environmental influences and affords mechanical stability thereof. In so doing, the housing has to be implemented in such a way that it also retains sufficient mechanical stability under situations of high mechanical loads (e.g., accidents). But at the same time, the range mentioned above is negatively affected by high housing weight. Nor can the size of the housing be flexibly adapted to the size of the accumulator arrangements, so that for every accumulator arrangement of different size, a corresponding housing has to be used. This leads to higher manufacturing costs of the accumulator arrangement.

SUMMARY

The task of the invention is to specify an accumulator arrangement made of separate storage facilities that facilitate foregoing an external housing component.

To solve this problem, an accumulator arrangement of the type mentioned at the beginning is provided according to the invention wherein every storage facility is incorporated in a rod-shaped hollow profile forming an equipment case, wherein the hollow profiles are combined to form a solid composite among one another.

The separate storage facilities, that can, for example, be implemented as accumulator cells or as composites of accumulator cells, thereby have their own inherently stable equipment case. In order to achieve the desired mechanical stability of the entire array, the separate equipment cases are fastened together to form a solid composite. Composites of the desired size can thereby be manufactured, dependent on the number of equipment cases used.

Compared to the prior art, the solution according to the invention has the advantage that an additional all-encompassing housing containing the entire accumulator arrangement can be avoided without having to sacrifice mechanical stability. The elimination of this housing leads, in addition, to a reduction of weight and manufacturing costs of the storage facility.

The bar-shaped hollow profiles can preferably be manufactured as extruded sections, preferably of aluminum or plastic. The use of extruded sections thereby provides for cost-effective manufacturing, while the use of lightweight materials like aluminum or plastic leads to a reduction in total weight. In order to afford the required mechanical stability, the hollow profiles need to have sufficient wall thickness, for example 2 to 5 mm (0.08 to 0.20 inch).

In so doing, the hollow profiles can be circular, triangular, rectangular, square-shaped, hexagonal, C-shaped or U-shaped in cross-section. Dependent on the selection of cross-sectional form or the selected combination of different cross-sectional forms, differently arranged composites of storage facilities can be achieved. The individual hollow profiles can be arranged both in parallel in the horizontal direction and one above the other. This facilitates a configuration of composites that can be adapted geometrically to the space available in the motor vehicle.

The individual hollow profiles of a bundle can be of different lengths or exhibit beveled ends in order to achieve the best possible adaptation of the accumulator arrangement to the respective assembly situation and to fit the available installation space.

Furthermore, the profiles of a bundle can be connected to one another with firm bonding or positively though lateral fasteners. For example, the hollow profiles can be welded to their respective neighbors and/or by lateral fasteners such as, for example, a dovetail joint or by tongue and groove. In so doing, it is possible, on the one hand, that the hollow profiles themselves have both tongue and groove available or, on the other hand, that the hollow profiles only have tongues available and their connection takes place via additional grooves. This facilitates the tight cohesion of the composite in a horizontal as well as a vertical direction and affords mechanical stability.

The hollow profile can also exhibit at least one cooling channel along its wall. These coolant channels can, for example, be connected to a cooling water circuit whereby during operation of the accumulator arrangement, resulting heat can be dissipated. The wall-side arrangement of the coolant channels offers the advantage of less thermal transfer resistance compared to external cooling channels and makes it possible to cool the individual storage facilities efficiently. The coolant channels can simply be produced directly as part of the extrusion section during manufacturing of the hollow profiles. As an alternative, the entire accumulator arrangement can be applied to an externally operating cooling system.

In addition, the respective storage facility can be arranged as a push-in component by means of which it can be insertable or is inserted into a hollow profile. This provides the advantage that every storage facility can be applied in accordance with the firmly bonded or positive connection of the hollow profiles. In addition, it is also possible that with the help of a push-in component, the storage facility can subsequently be removed again and for example, in the case of a defect, be exchanged. Depending on the length of the push-in component and the length of the hollow profile, it is also possible that a push-in component can be introduced into a hollow profile from both ends. Furthermore, the push-in components can be implemented in such a way that they can be fastened to the front sides of the hollow profiles, e.g., through the use of one or several screws.

In addition, every push-in component can have at least one face plate that locks the hollow profile in the pushed-in condition. This offers the advantage that when using one push-in component per hollow profile or if both ends of the hollow profile are closed in such a manner that the inside of the hollow profile or rather, the storage facilities located there, are protected from environmental influences such as, for example, invasive moisture.

The invention can furthermore be configured in such a way that the push-in components are implemented as slides, preferably made of aluminum or plastic. The implementation as slides offers the advantage of a comparatively simple construction of the push-in components. Here, as well, the use of light-weight materials such as aluminum, for example, leads to an overall lower total weight of the entire construction. It is possible to equip the slides and/or the inside walls of the hollow profile with corresponding guide structures so that the pushing-in or pulling-out of the push-in component is configured as simply as possible and so that jamming can be avoided as much as possible. Besides the implementation as gliding slides, other forms of implementations of the push-in components are conceivable; for example, the push-in components can be implemented as skids made of aluminum or plastic. In addition, the push-in components can be equipped with elements that further simplify insertion and removal such as, for example, wheels or rollers.

One possibility for connecting the individual storage facilities to one another electrically consists of making the storage facility electrically connectable or them being connected with each other electrically via the push-in components. This offers the advantage of a comparatively simple assembly process since after the pushing in of the push-in component, no further electrical connections need be made. An electrical connection via the push-in components can, for example, take place via the surfaces brought into contact on their front plates. With that, the contact surfaces of a push-in component are implemented in such a way that they are both in contact with the storage facility positioned at this push-in component as well as create an electrical contact at a further neighboring storage facility. This makes it possible to electrically connect all storage facilities with one another in a composite.

One other possibility of contacting provides that the storage facilities can be electrically connected or are connected electrically with one another by means of separate fasteners. In doing this, the connections take place, for example, by cable. It is advantageous in doing so that the storage facilities are connected via a front side of the hollow profiles in a simple fashion with other desired storage facilities of the same composite and/or can be connected to other components of the motor vehicle.

A third possibility for contacting can be achieved by having the storage facilities electrically connectable or connected electrically with one another across at least one contact rail wherein the contact rail covers several front sides of the hollow profiles. The advantage of this arrangement consists of the fact that the contact rail can be designed in such a way that it also closes the front side of the hollow profiles alongside the electrical connection of the storage facilities. In so doing, the closure of the hollow profiles can be configured in such a way that the inside of the hollow profiles, or rather the storage facilities located there, are protected from external influences such as, for example, the penetration of moisture. The electrical contacting of the storage facilities can be accomplished in the process in that the contact rail can, for example, have flexibly mounted contacts on its side facing inward, which—with attached contact rail—produce an electrical connection to the respective contact surfaces on the sides of the storage facilities facing the contact rail. The attached contact rail can be attached to the hollow profiles with screws or a latching mechanism.

To increase the stability of the accumulator arrangement, it is possible in addition that the composite of hollow profiles is bound inside a frame. In so doing, the struts of the frame can be particularly manufactured from existing extrusion sections made of aluminum or plastic. The struts of the frame can be implemented in accordance with the external form of the composite and attached to one another so that they enclose the composite tightly. The struts can preferably be arranged in such a way that at least two opposing struts of the frame run parallel to the front surfaces of the enclosed hollow profiles. The gap between the frame and the composite of hollow profiles bound by it can thereby be covered with sheet metal attached in addition to the frame and/or the bundle in order, for example, to build a kind of Faraday cage.

BRIEF DESCRIPTION OF THE DRAWINGS

Other advantages and details of the invention result from the embodiments described in the following as well as from the drawings, which show in.

DETAILED DESCRIPTION

The sizes determined by the number of hollow profiles that are selected in the following composites presented as examples are selected randomly. Depending on the technical and spatial requirements, appropriate composites can be realized in the desired size. The following figures are, all of them, mere schematic diagrams.

Figure 1:
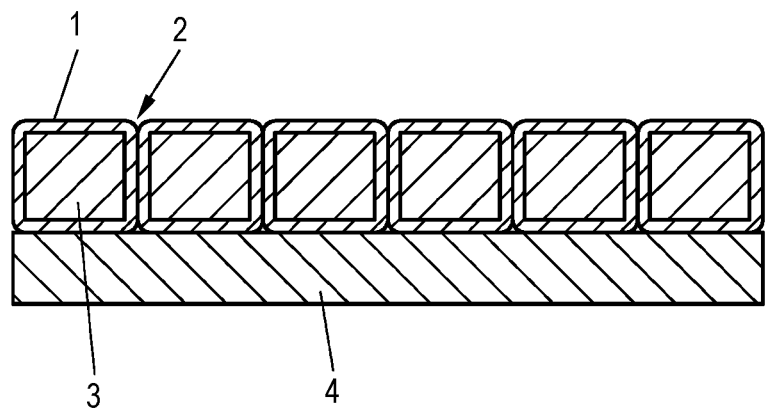
FIG. 1 a sectional side view of an accumulator arrangement according to the invention, FIG. 2 a sectional side view through a further accumulator arrangement according to the invention made of positively connected hollow profiles with a hexagonal cross-section.

FIG. 1 shows as a sectional view an accumulator arrangement according to the invention consisting of six similar hollow profiles 1 with rectangular cross-sections. The hollow profiles are thereby manufactured as extruded aluminum sections in the process of which their outer corners are rounded owing to the method of production. In the gaps 2 caused by this rounding, the hollow profiles are connected to one another by dot-shaped spot welds or a continuous welded seam. Inside the hollow profiles are located storage facilities 3 in appropriate contact with each other, which can be implemented for example as lithium-ion accumulators or as capacitors. An external cooling system 4 is connected to the composite of hollow profiles.

Figure 2:
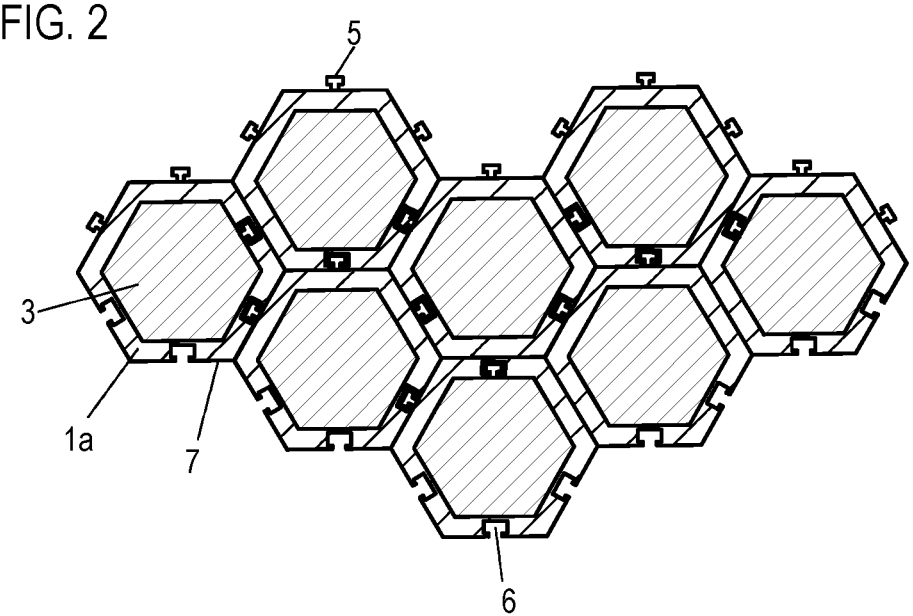

FIG. 2 shows a sectional side view through a composite of hollow profiles 1a of hexagonal cross-section that are connected positively to one another. Every individual hollow profile has three distinct grooves 5 on the sides of their upper halves and matching tongues 6 on the sides of the lower halves, so that positively bound composites of desired sizes of equally pronounced hollow profiles 1a can be formed. In addition to this positive connection, the hollow profiles can be welded at the edges of their contact surfaces

7. On the inside of the hollow profiles are located the storage facilities 3. For one implementation of the hollow profiles 1*a*, the tongue 6 and grooves 5 can be formed as extruded sections of aluminum in the manufacturing process of the extrusion profile.

Figure 3:
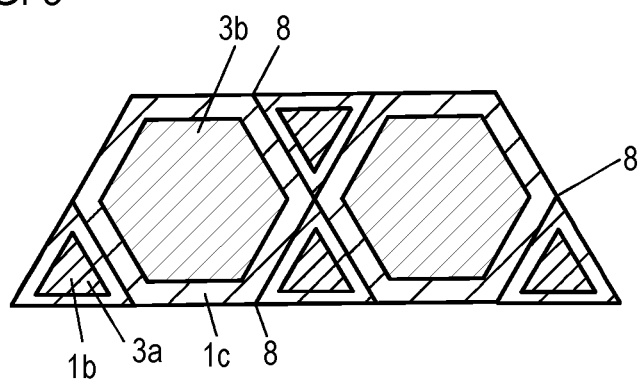
FIG. 3 a sectional side view of an accumulator arrangement according to the invention made of hollow tubes of differing cross-sections, FIG. 4 a perspective side view onto an accumulator arrangement according to the invention.

FIG. 3 shows a sectional side view of a further accumulator arrangement according to the invention, wherein the hollow profiles 1*b* have a triangular cross-section and the hollow profiles 1*c* a hexagonal cross-section. The connection of the individual hollow profiles 1*b* and 1*c* takes place in this example via welding seams applied to the edges 8 of the side surfaces. The storage facilities 3*a* located in the hollow profiles 1*b* have a triangular cross-section and the storage facilities 3*b* located in the hollow profiles 1*c* have a corresponding hexagonal cross-section. By adding further hollow profiles 1*b* and/or 1*c*, the composite can be expanded as desired in the horizontal and vertical directions. Depending on the cross sections of the hollow profiles 1*b* and 1*c* used, any desired number of combinations and geometric arrangements of the hollow profiles 1*b* and 1*c* within a composite can be realized.

Figure 4:
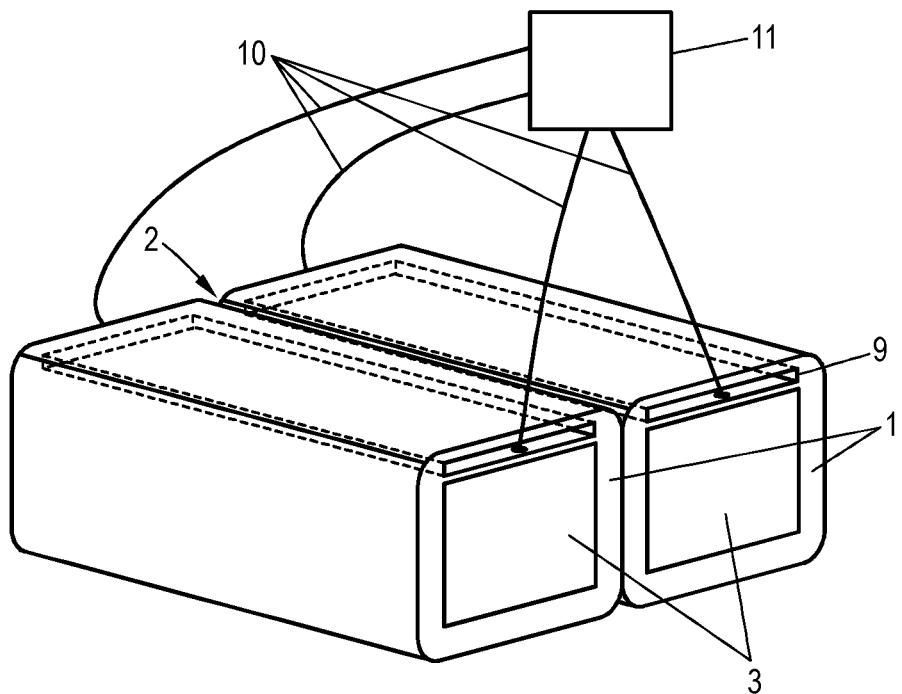

FIG. 4 shows a perspective side view of an accumulator arrangement according to the invention consisting of two hollow profiles 1 that are manufactured as an aluminum extrusion. Both profiles have at least one coolant canal 9 along a wall. Both profiles are connected together with a welding seam that extends in the gap 2. The coolant channels 9 can be connected via suitable coolant hoses 10, here shown schematically, to an external coolant system 11 such as, for example, a cooling water circuit. In this manner, a low thermal transfer resistance is provided for cooling of the storage elements 3 located in the hollow profiles 1.

Figure 5:
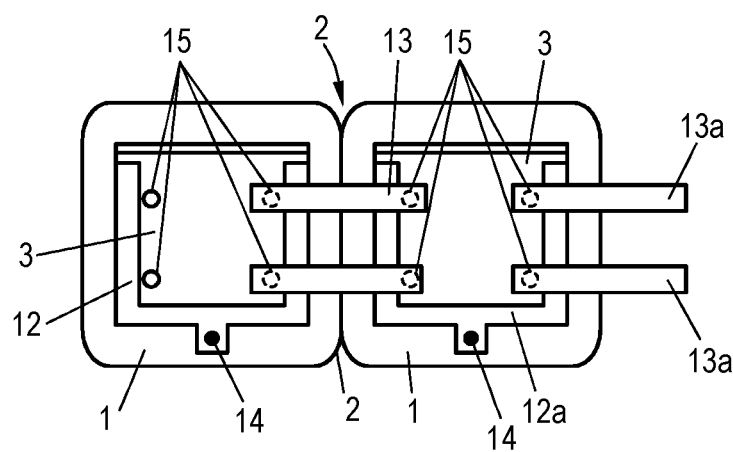
FIG. 5 a side view onto an accumulator arrangement according to the invention with an electrical connection of the storage facilities achieved through push-in elements, FIG. 6 a plan view onto an accumulator arrangement according to the invention with storage facilities connected with fasteners, FIG. 7 a plan view onto an accumulator arrangement according to the invention with storage facilities connected via a contact rail and bound in a frame, and FIG. 8 a perspective view of a contact rail for the connection of two storage elements.

FIG. 5 shows a side view of two hollow profiles 1 connected by a welding seam extending along the edges 2. In these hollow profiles, the storage facilities 3 are introduced via the push-in drawer components 12 and 12*a*. The hollow profiles 1 are implemented as extruded aluminum sections. The push-in drawers 12 and 12*a* are implemented as slides made of aluminum. In the pushed-in condition, they are held motionless in the inner space of the hollow profiles 1. Aside from a clamp bracket, this can also be implemented by means of, e.g., a mounting bracket. The storage facilities 3 are also connected with each other electrically via the contact surfaces 13 of the push-in component 12. The contact between contact surfaces 13 and the storage facilities 3 can hereby take place, for example, via the contacts 15 applied to the front surfaces of the storage facilities 3. With the contact surfaces 13*a* of the push-in component 12*a*, the storage facilities 3 can be connected in a larger arrangement with more storage elements in the horizontal direction. Through a respective arrangement of additional contact surfaces not shown here, contacts to storage elements of a larger composite arranged in a vertical direction are also possible. In doing so, the contact surfaces 13 and 13*a* made of an electrically conductive material are implemented such as, for example, copper, that they electrically connect the respective storage facilities 3 in the accumulator arrangement desired for the entire system. These could, for example, consist of storage facilities 3 in a parallel circuit of accumulators or capacitors. By means of the flaps 14, the push-in components 12 and 12*a* can be fastened to the front sides of the hollow profile 1 with a screw or a mounting mechanism, for example, in order to prevent an unwanted slippage of the push-in components 12 and 12*a* and to secure the electrical contact between the storage facilities 3.

Figure 6:
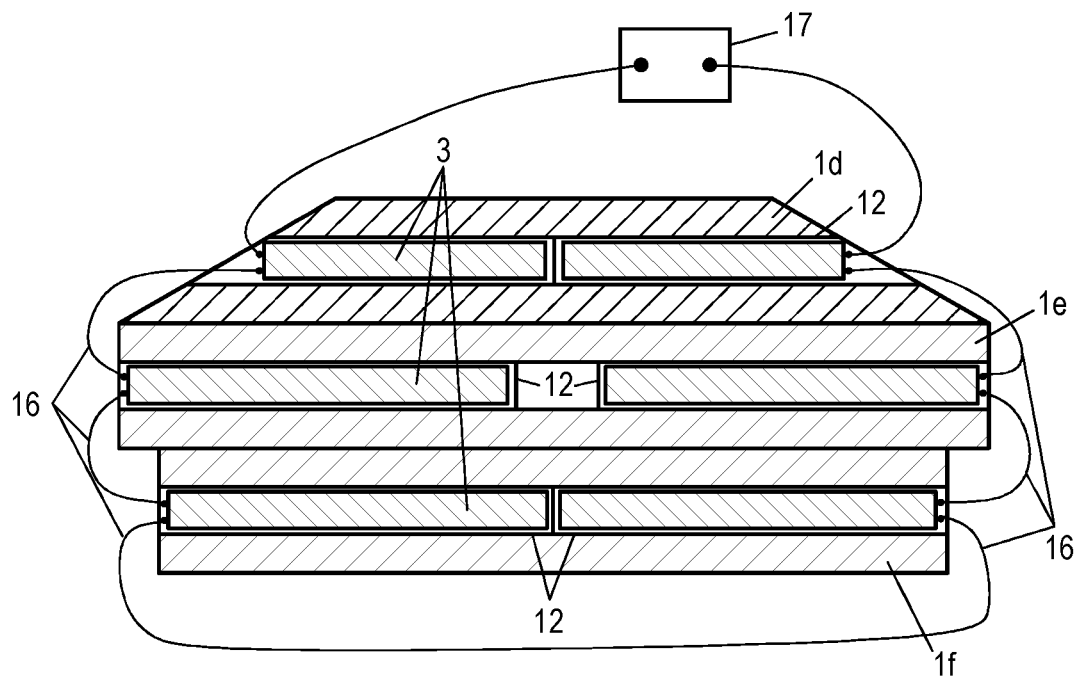

FIG. 6 shows a plan view onto an accumulator arrangement of three hollow profiles, 1*d*, 1*e* and 1*f* according to the invention, wherein the hollow profiles 1*d*, 1*e*, and 1*f* are implemented as extruded aluminum sections. The view is sectioned parallel to the plane of the drawing in order to unblock the view onto push-in components 12 located in the hollow profiles 1*d*, 1*e* and 1*f* and the 3 disposed on them. In this case, the hollow profile 1*d* has beveled ends. In addition, the lengths of hollow profiles 1*e* and 1*f* differ. The variety of composites resulting from the shapes of the hollow profiles 1*d*, 1*e*, and 1*f* according to the invention makes it possible to adapt the external form of the composites to the space available in the particular installation situation in the motor vehicle. Into every hollow profile 1*d*, 1*e* and 1*f*, two push-in components 12 were introduced with one storage facility 3 in each case. The storage facilities 3 are connected to each other electrically via the fasteners 16 in a way that complies with the desired function of the entire accumulator arrangement. As already explained in FIG. 5, this could consist, for example, of a parallel connection to a storage facility 3 implemented as accumulators or capacitors. By using additional fasteners 15, a connection of the entire accumulator arrangement to other components 17 of the motor vehicle is also possible.

Figure 7:
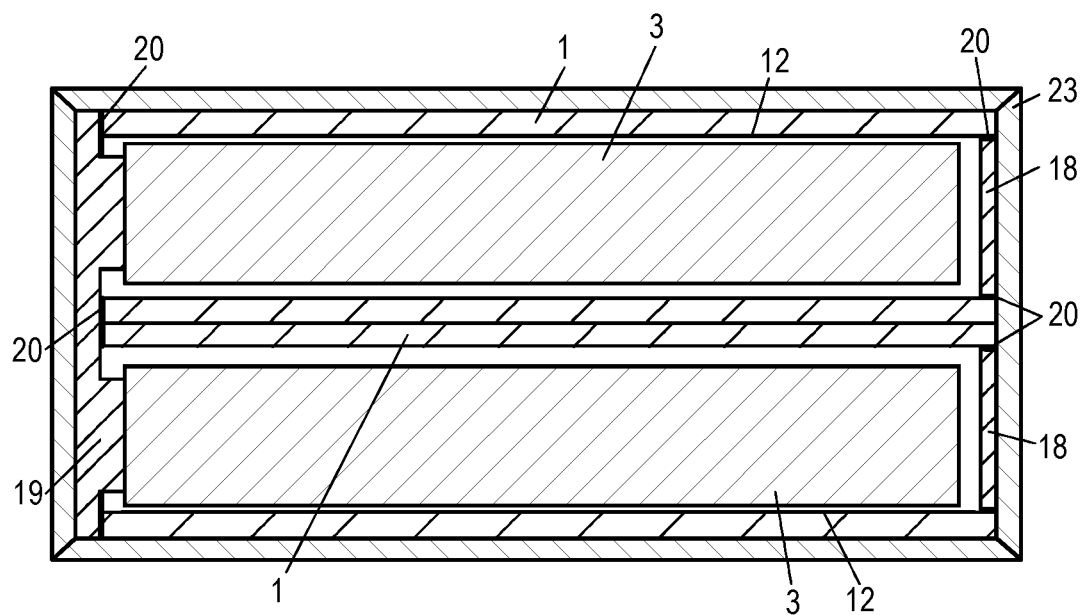

FIG. 7 shows a top view onto an accumulator arrangement according to the invention, consisting of two hollow profiles 1. The view is sectioned parallel to the plane of the drawing in order to unblock the view onto push-in components 12 located in the hollow profiles 1 and the storage facilities 3 located thereon. The hollow profiles are implemented as extruded aluminum sections. The push-in components 12 manufactured as aluminum slides have at one of their ends in each case a faceplate 18 with which the front surfaces of the interiors of the hollow profiles 1 are sealed when the push-in components are pushed in. The side of the hollow profile 1 across from the face plates 18 is sealed by a contact rail 19 which is described in more detail in FIG. 8. A water-tight seal of the interior of the hollow profiles 1 by means of the contact rail 19 and the face plate 18 is implemented through the use of appropriate seals 20 at the face plate 18 and contact rail 19. The accumulator arrangement 1 is bound on the sides by a frame 23, wherein two of the struts run parallel to the front surfaces of the bound hollow profiles. For example, the struts of the frame 23 can be carried out in cross-section as L-shaped hollow profiles of aluminum or plastic. To afford the mechanical stability of the frame 23, the struts can be fastened together at their front surfaces, shown here as beveled, by for example, screw connections not shown here and/or by a design that permits the forming of interlocking connections to neighboring struts.

Figure 8:
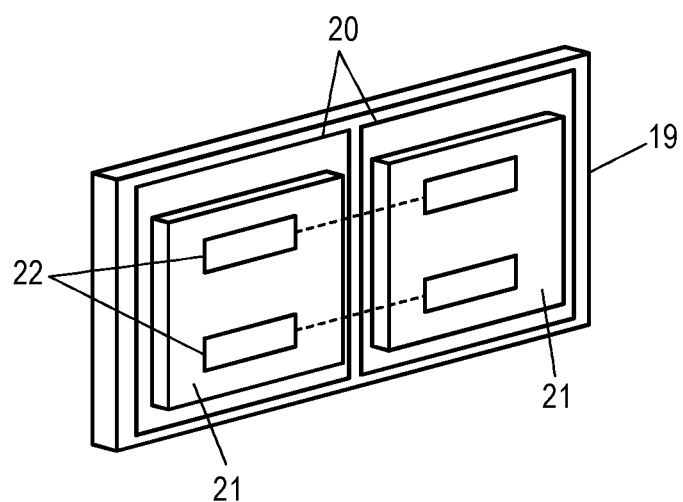

FIG. 8 shows the contact rail 19 from FIG. 7 in a perspective view. The seals 20 facilitate a water-tight seal of the interior of the hollow profiles 1 sealed by the contact rail. The protrusions 21 are implemented such that they electrically connect the accumulator arrangements 3 as shown in FIG. 7 with the contacts 22 integrated on the contact rail and made of an electrically conductive material. The contacts 22 are, as indicated by the dashed line, connected to the inside of the contact rail 19. In the case of an accumulator arrangement consisting of several storage elements, both wider and/or longer contact rails can be used with a corresponding structure or several separate contact rails can be used. The contact rail can have contact surfaces for the contacts 22 in order to make it possible to connect them with other components of the motor vehicle.

The invention claimed is:

1. An accumulator arrangement comprising a plurality of equipment cases, each of which containing a storage element for storing electrical energy,
   wherein each equipment case is formed as a bar-shaped hollow profile which surrounds the storage element and which is attachable to and detachable from other equipment cases in a modular fashion,
   wherein the plurality of equipment cases are fastened to each other to form a fixed composite,
   wherein the fixed composite is framed in a frame, such that at least two facing struts of the frame run parallel to end surfaces of the plurality of equipment cases,
   wherein a longitudinal cooling channel is formed completely in a wall of each of the plurality of equipment cases, such that each of the longitudinal cooling channels are kept separate from each of the storage elements and the longitudinal cooling channels are connectable to an external cooling system,
   wherein each of the equipment cases are closed at a first end by a fluid-tight faceplate and closed at a second end by a fluid-tight contact rail to seal the storage element within each equipment case, and
   wherein each contact rail is provided with electrical connections for connecting with the storage elements.

2. The accumulator arrangement according to claim 1, wherein the plurality of equipment cases are each manufactured as extruded sections.

3. The accumulator arrangement according to claim 2, wherein the bar-shaped hollow profile has a circular, triangular, square-shaped, hexagonal, C-shaped or U-shaped cross-section.

4. The accumulator arrangement according to claim 2, wherein the plurality of equipment cases are firmly bonded to one another and/or connected to one another through lateral fasteners.

5. The accumulator arrangement according to claim 2, wherein each storage element is arranged with a push-in component by means of which the storage element is insertable into the corresponding equipment case.

6. The accumulator arrangement according to claim 1, wherein the bar-shaped hollow profile has a circular, triangular, square-shaped, hexagonal, C-shaped or U-shaped cross-section.

7. The accumulator arrangement according to claim 6, wherein the plurality of equipment cases are firmly bonded to one another and/or connected to one another through lateral fasteners.

8. The accumulator arrangement according to claim 6, wherein each storage element is arranged with a push-in component by means of which the storage element is insertable into the corresponding equipment case.

9. The accumulator arrangement according to claim 1, wherein the plurality of equipment cases are firmly bonded to one another and/or connected to one another through lateral fasteners.

10. The accumulator arrangement according to claim 9, wherein each storage element is arranged with a push-in component by means of which the storage element is insertable into the corresponding equipment case.

11. The accumulator arrangement according to claim 1, wherein each storage element is arranged with a push-in component by means of which the storage element is insertable into a corresponding equipment case.

12. The accumulator arrangement according to claim 11, wherein the push-in components are configured as a slide or a skid.

* * * * *